July 28, 1936.  C. A. FRICK  2,049,383

BOTTLE DISPENSING MACHINE

Filed Jan. 25, 1933   2 Sheets-Sheet 1

INVENTOR.
Chester A. Frick
BY
Hood & Hahn
ATTORNEYS

July 28, 1936.  C. A. FRICK  2,049,383
BOTTLE DISPENSING MACHINE
Filed Jan. 25, 1933  2 Sheets-Sheet 2
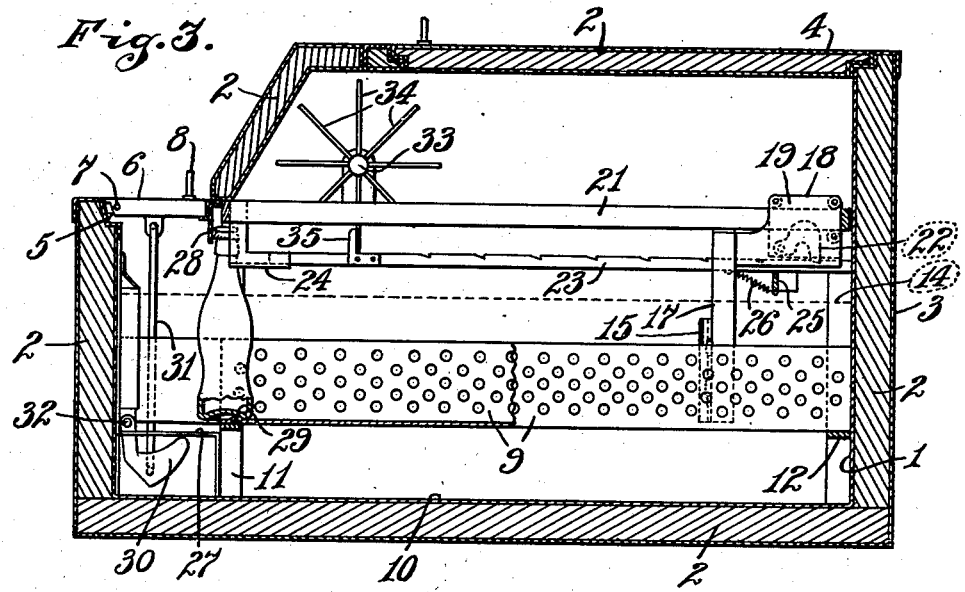
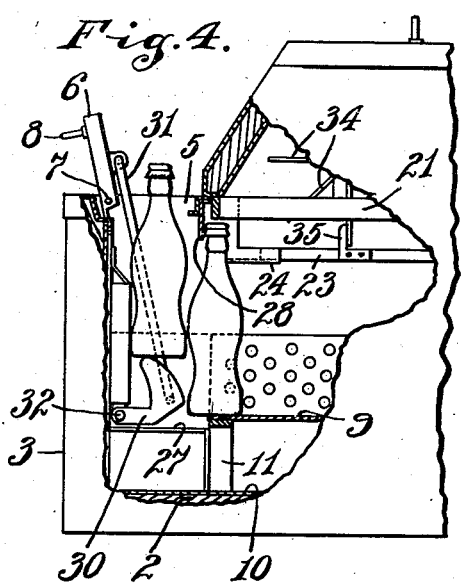
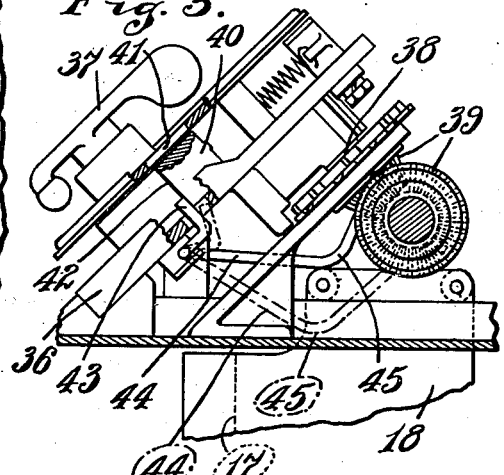
INVENTOR.
Chester A. Frick
BY
Hood + Hahn.
ATTORNEYS Patented July 28, 1936

2,049,383

UNITED STATES PATENT OFFICE 2,049,383

BOTTLE DISPENSING MACHINE

Chester A. Frick, Muncie, Ind., assignor to Glascock Brothers Mfg. Co., Muncie, Ind., a corporation of Indiana Application January 25, 1933, Serial No. 653,389

12 Claims. (Cl. 312—36)

My invention relates to improvements in dispensing devices for bottled goods such for instance as pop et cetera and has for one of its objects the provision of a dispensing device which will handle and permit the storage of a relatively large number of bottles avoiding the necessity of frequently refilling the device.

Another object of my invention is the provision of a dispensing device of the above character which will provide means for refrigerating or cooling the bottled goods before dispensing.

Another object of my invention is the provision of a coin-controlled dispensing device which will handle a relatively large number of bottles and dispense a single bottle at a time, at the same time preventing the removal of other bottles from the device.

For the purpose of disclosing my invention I have illustrated one embodiment thereof in the accompanying drawings in which:

Fig. 3 is a longitudinal section of the dispensing refrigerator;

Fig. 4 is a detail section showing the bottles in dispensing position, and

Fig. 5 is a detail elevation showing means for preventing the insertion of a coin in the coin-controlled device or the operation of the same after the last bottle in the container has been delivered.

Figure 1:
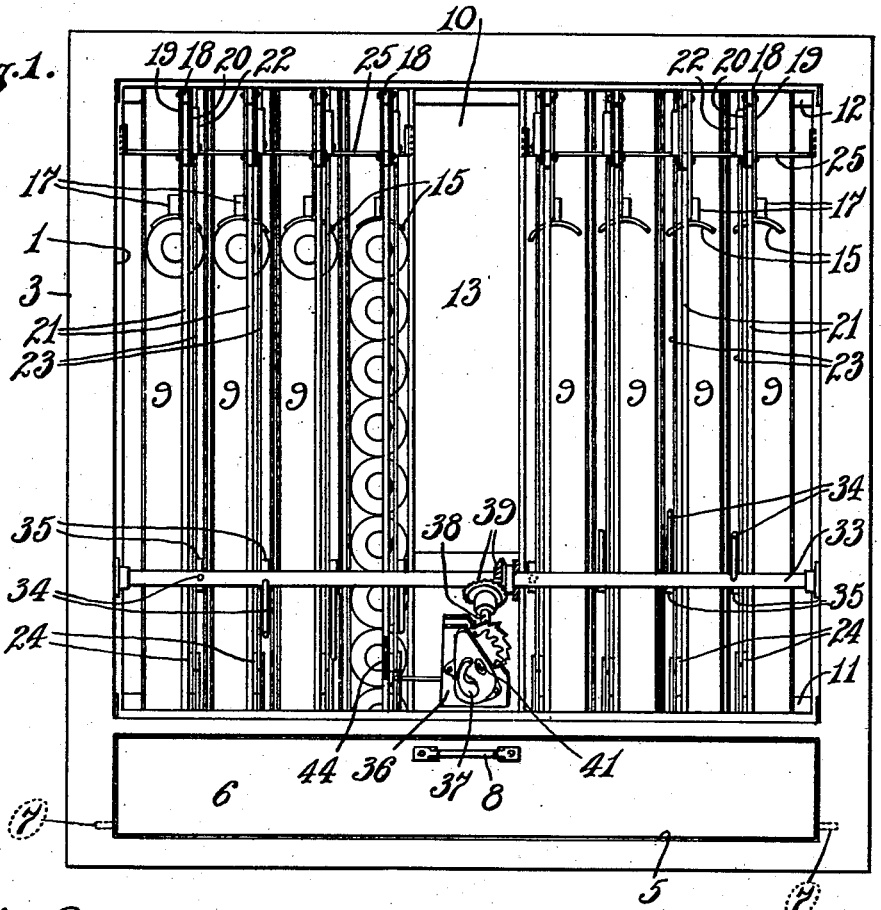
Fig. 1 is a plan view of a dispensing refrigerator embodying my invention, with the top removed.
Figure 2:
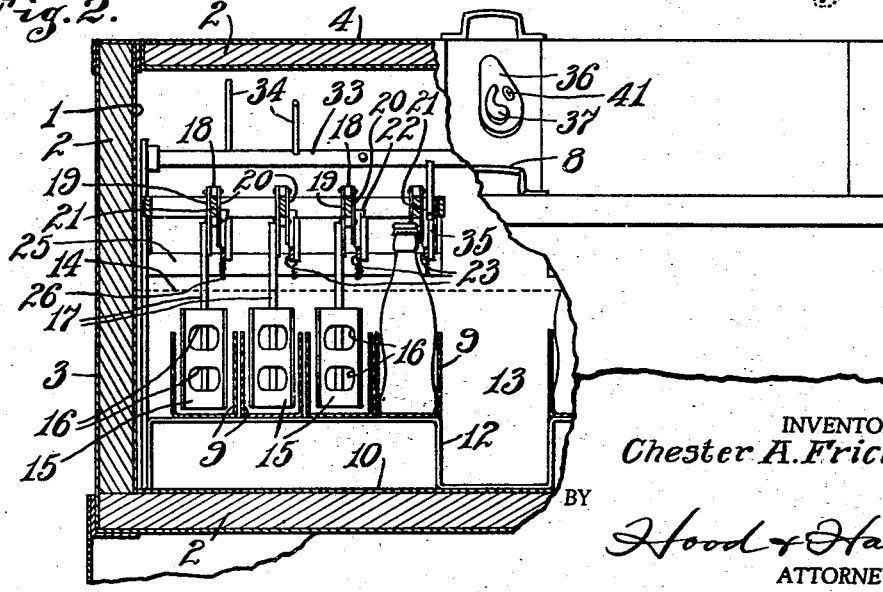
Fig. 2 is an end elevation partly in section of the dispensing refrigerator.

In the embodiment of the invention illustrated I provide a suitable refrigerating container preferably comprising an inner tank or tub 1 which is surrounded by suitable insulating material, both at the top, bottom and sides as at 2 and the outer portion of the container is surrounded by a suitable sheet metal or other covering 3. The top of the container is closed by a cover member 4 which in actual practice would be, under normal conditions, locked against removal. The front end of the container tapers down to provide a dispensing opening 5 at its front end, and this opening is closed by a closure member 6 hinged in position at 7 and provided with a handle 8 to permit the same to be opened and closed.

Within the container I provide a series of U shaped channel members 9 which are supported above the bottom 10 of the tub 1 by means of inverted U shaped supports 11 and 12 located at the front and back of the channel members. In the structure illustrated I provide a set of four of such channel members on one side of the casing and a similar set of four on the opposite side of the casing leaving between the casing a space 13, which permits the insertion of crushed ice in and the forcing of crushed ice beneath the channel members 9. Normally the dispenser is adapted to contain crushed ice and cooling water up to about the level indicated by the dotted line 14 or at a point just below the neck of the bottle or bottles.

Each of the channels is provided with a bottle propeller 15 which preferably is arcuate in shape and is provided with relief openings 16 to permit the same to readily pass through the cooling liquid. Each of these propellers is carried on a downwardly extending propeller arm 17 mounted on a carrier 18 comprising a pair of spaced apart plates 19 and 20 connected together and straddling a guide rail 21 extending the full length of the channel members and rigidly supported in the casing. This carrier 18 is also provided with a pivoted dog 22 adapted to be maintained in engagement with a reciprocating feeder rack 23. This rack is reciprocably mounted, at one end in a slot formed in a bracket 24 and at the other end in a slot formed in a cross bar 25. A coiled spring 26 biases the feeder rack 23 in its retracted position. It is therefore obvious that as the rack is moved forward the carrier 18, due to the engagement of the dog 22 with the first notch of the rack, will be correspondingly moved forward. As soon however as the rack is released it will be retracted to its normal position, leaving the propeller carried in the position to which it had been moved by the first movement of that rack and that a continued reciprocation of the rack will feed the carrier forward step by step. The distance of each step of the carrier is equal to the space of one bottle of the row of bottles which is supported in the channel in front of the propeller, the propeller being located at the rear of the entire row. This one-step movement will force the first bottle of the row out of the channel onto a platform 27 which is immediately beneath the closure member 6 and is slightly less in height than the bottom of the channel so that as the bottle moves off the channel it will drop slightly. Arranged in the path of the bottles, as they move from out of the channel onto the platform 27, is a cross stop member 28 which extends below the top of a bottle as the bottle rests in the channel member. Therefore in moving from the channel to the platform 27 the bottle is tilted slightly forward so that the lower end will move out of the channel first and then drop on the platform thus clearing the upper end of the bottle from the stop 28. Furthermore, in order to prevent vibration from jarring the lower end of the bottle free, the bottom of the channel at the point where the first bottle of the row will come to rest is provided with an upturned projection 29 which will engage in the convex bottom of the bottle. This projection is not sufficient to offer any obstruction to the bottle as it is moved by the propeller out of the channel but does offer sufficient obstruction to prevent the box from being tilted and vibrated sufficiently to jar the bottles forward into the delivery portion of the container.

For each of the channels there is provided a raising and obstruction dog 30. One of these dogs is provided for each channel and the dogs are connected by suitable link connections 31 with the cover 6, the dog being pivoted as at 32, so that when the cover is raised all of the dogs for all of the channels will likewise be raised. When a bottle has been projected from one of the channels onto the platform 27 the dog for that channel will engage beneath the bottle and raise the same, as illustrated in Fig. 4, to a position where it may be readily grasped by the operator. The remaining dogs will likewise be raised and it will be noted that these dogs will all be in the path of the bottles of the remaining channels, and even the raising dog will be in the path of the next succeeding bottle so that none of the bottles, except that one which has been delivered to the platform, may be removed from the container. Furthermore, the position of the dogs 30 when the cover member 6 is raised to permit the removal of the one delievered bottle prevents further operation of the coin-controlled operating mechanism. With the dogs 30 raised and a continuous row of bottles in each channel between the dogs and the respective propellers of the channels it will be seen that the dogs act as stops to prevent forward movement of the rows of bottles and, of course, the forward movement of the propellers. With the propellers locked against forward movement it is obvious that, due to the fact they are locked to the handle of the coin-controlled device, at least for forward movement, through the medium of the rods 23, the drive mechanism 38 and 39, the handle of the coin-controlled device can not be moved in a propelling direction.

For manipulating the propellers successively I provide a driving device which preferably consists of a shaft 33 having radially extending therefrom a series of fingers 34 which are arranged about the shaft in staggered relation, one finger being provided for each of the propellers and the circumferential distance between the ends of the fingers being such as to cause the next succeeding finger to engage a trigger arm 35, with which each of the racks 23 is provided, of the next succeeding rack. For example, when the first of the series of fingers engages the trigger arm 35 of the first of the series of racks it will move the rack forward sufficiently to project one bottle from its channel. As soon as this has been accomplished the finger will clear the trigger arm 35 permitting that rack to reciprocate to normal postion. The next succeeding finger will then have been brought into position to engage the trigger arm 35 of the next succeeding rack and thus each rack across the width of the container will be operated once and then the operation will commence again so that on each movement of the shaft 33 one bottle alone will be delivered from a channel.

For rotating the shaft 33, I provide a suitable coin-controlled mechanism 36 provided with a manipulating handle 37 which, when a suitable coin is deposited in the apparatus connects this handle with a shaft 38 having a beveled gear driving connection 39 with the shaft 33. The manipulating handle 37 of the coin-controlled mechanism can be moved, after the insertion of a coin, only a sufficient distance to operate or move one of the fingers 34 sufficiently far to deliver a single bottle. After the release of the handle it will of course retract to its original position for again rotating the shaft 33 upon the deposit of another coin.

It is thus seen that by the above structure I provide a plurality of channels adapted to maintain the bottles in a vertical position, one immediately behind the other, and provide means for successively and repeatedly delivering a bottle from each of the channels whereby a large number of bottles may be handled in the container by a single coin-controlled apparatus.

When the container has been emptied of bottles it may be refilled by removing the cover member 4 and inserting, after the propellers have been moved to their rearmost position, the bottles in the channels by threading the same between the guide bars 21.

In Fig. 5, I have illustrated a means whereby after the last bottle has been delivered from the container insertion of a coin in the coin-controlled device, or the operation of the coin-controlled device is prevented. With the arrangement of the radial fingers 34 as shown the last bottle to be delivered from the device will be delivered from the channel adjacent the ice filling opening 13 on the left-hand side. The coin-controlled device in addition to the handle 37, and the propelling shaft 38, as well as the gears 39, is provided with a coin-receiving member 40 immediately behind the coin slot 41. Under normal circumstances the insertion of a coin in the slot 41 provides a connecting means between the coin-receiving member 40 and the driving mechanism so that when the handle 37 is manipulated the driving mechanism will be manipulated. When the handle 37 is manipulated to deliver a bottle a portion of the coin-receiving member 40 moves into a position in front of the coin slot 41 so that the handle must be retracted to its full position before another coin can be inserted. This coin-receiving member 40 is provided with a shoulder 42 and cooperating therewith is a stop member 43 mounted on a pivoted manipulating rod 44 having a cam formation 45 adapted to cooperate with the top of the propeller operating mechanism 19, operating in the bottle-receiving channel to the left, looking at Fig. 1 of the ice-receiving opening 13. When the bottle propeller mechanism 19 delivers the last of the bottles from its channel this mechanism engages the cam portion 45 of the arm 44, thereby throwing the stop 43 in the path of the shoulder 42 which prevents the retraction of the handle 37 and coin receiver member 40. This not only prevents the insertion of a coin through the slot 41 but also prevents manipulation of the lever 37 until after the operator has moved the propellers 17 to their full retracted position and refilled the channels with bottles. Of course, as soon as the mechanism 19 is moved from beneath the cam portion 45, the stop member 43 will be retracted from beneath the shoulder 42, permitting the operating lever 37 to return to its initial position.

I claim as my invention:

1. In a bottle dispenser, the combination with means for supporting the bottles to be dispensed in a refrigerating bath in a plurality of side by side rows, of a propeller for the bottles of each of said rows and operating means for said propellers supported in its entirety above and out of the bath and enforcing successive advancement in predetermined sequence of said propellers a distance equal to the space of a bottle.

2. In a bottle dispenser, the combination with means for supporting the bottles to be dispensed in a refrigerating bath in a plurality of side by side rows, of a propeller for the bottles of each of said rows, means mounted in its entirety above and out of said bath for successively advancing the propellers a distance equal to the space of a bottle and a single operating handle for said means.

3. In a bottle dispenser, the combination with means for supporting the bottles to be dispensed in a refrigerating bath in a plurality of side by side rows, of a propeller for each row of bottles, actuating means for said propellers mounted above the bath for enforcing the successive movement of the propellers in a predetermined sequence to move the bottles of each row a distance equal to the space of one bottle to deliver a bottle to a position to be removed from the dispenser, means permitting access to the delivered bottle and means rendered operative by the access-permitting means for preventing the removal of the remaining bottles from the rows.

4. In a bottle dispenser, the combination with means for supporting the bottles to be dispensed in a refrigerating bath in a plurality of side by side rows, a propeller for the bottles of each row, a reciprocating means for advancing said propeller step by step mounted above and out of said bath and manually operated means for successively engaging said reciprocating means and operating the same, said means enforcing the operation of said reciprocating means in a predetermined sequence.

5. In a bottle dispenser, the combination with means for supporting the bottles to be dispensed in a plurality of side by side rows, a propeller for the bottles of each of said rows supported above the bottles, a reciprocating means mounted above the bottles for advancing said propeller step by step and a rotatable manually operated means having means successively engaging and moving said reciprocating means.

6. In a bottle dispenser, the combination with a container, of means for supporting the bottles to be dispensed in said container in a plurality of side by side rows, means for engaging and propelling the bottles of each row towards a delivery position, means for enforcing successive propelling of the bottles of each row in a predetermined order, a closure for the container, means for delivering the bottles propelled into delivery position operated by said closure, said delivery means locking the bottoms of the remaining bottles in all of the channels against forward movement during the delivery of the delivered bottle, and stop means for preventing the forward movement of the top of the bottles.

7. In a bottle dispenser, the combination with a casing, of a plurality of channels arranged in side by side relation and adapted to support the bottles in a vertical upright position, one behind the other, a delivery space at the end of said channels, means for successively engaging the bottles of the channels and propelling them to said delivery space, a hinged closure member for said delivery space and means rendered operative by the opening of said closure member on its hinges for preventing the removal of any of the bottles of any of said channels.

8. In a bottle dispenser, the combination with a casing, of a plurality of channels arranged side by side in said casing and adapted to support the bottles in vertical upright position one behind the other, means for successively propelling the bottles in the channels through said channels and into a delivery space, a stop member projecting to a point below the top of the bottles in the channels, a closure member for said delivery space and means operated by the opening of said closure member for locking the bottoms of the bottles in all of said channels against forward movement.

9. In a bottle dispenser, the combination with a casing, of a series of channels arranged side by side in said casing for supporting a plurality of bottles in upright position one behind the other, means for successively propelling the bottles of the channels into a delivery position, a stop member in the path of the top of the bottles of each channel, at the end of the channel, elevating members at the end of the channels, each being adapted to engage and raise a bottle delivered thereto and be moved into the path of the lower end of the bottles of the channels, and means operated by the raising of one elevator member with a bottle thereon for simultaneously raising the remaining elevator members in a position to block the forward movement of the remaining bottles.

10. In a bottle dispenser, the combination with a plurality of channels arranged side by side, each adapted to receive and support a plurality of bottles in a vertical upright position one behind the other, a propeller for each of said channels, a support for said propeller above said bottles a reciprocating member above said bottles for advancing said propeller step by step and biased in its retracted position and a hand operated rotatable member above said bottles and having fingers for successively engaging said reciprocating members of the channels to successively move the bottles of the channels through said channels.

11. In a bottle dispenser, the combination with a plurality of channels arranged in side by side relation and each supporting a plurality of bottles in vertical upright position one behind the other in a refrigerating bath, of a propeller for each of said channels, a reciprocating member for each of said propellers for moving the same step by step and mounted above and out of said bath and an operating member for successively moving said reciprocating members.

12. In a bottle dispenser, the combination with a casing having a delivery opening in the top thereof, of a plurality of channels arranged in said casing in side by side relation, each adapted to support a plurality of bottles one behind the other, a propeller for each of said channels, a reciprocating rack having a one way engagement with said propeller, a reel having a plurality of radially disposed staggered fingers thereon each adapted to engage and move one of said racks in one direction to propel the row of bottles through the channel and deliver a bottle beneath said delivery opening, a closure member for said delivery opening, means manipulated by the opening of said closure member for raising the bottle delivered therebeneath and means rendered operative by the opening of said closure member for preventing the removal of bottles from the channels.

CHESTER A. FRICK.